(12) United States Patent
Inakawa et al.

(10) Patent No.: US 7,738,133 B2
(45) Date of Patent: Jun. 15, 2010

(54) DEVICE AND METHOD FOR RESTRICTING DISPLAY OF HISTORY

(75) Inventors: Yuriko Inakawa, Saitama (JP); Jun Wakamatsu, Saitama (JP); Noriyuki Tatsuma, Saitama (JP); Eiji Nishi, Saitama (JP); Akira Okamoto, Saitama (JP); Matsaki Kurokawa, Saitama (JP); Atsushiro Itoh, Saitama (JP); Fumio Harada, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1112 days.

(21) Appl. No.: 11/392,587

(22) Filed: Mar. 30, 2006

(65) Prior Publication Data

US 2007/0061374 A1  Mar. 15, 2007

(30) Foreign Application Priority Data

Sep. 14, 2005  (JP) .............................. 2005-266965

(51) Int. Cl.
*G06F 15/00* (2006.01)
*G06F 13/00* (2006.01)

(52) U.S. Cl. ..................................... 358/1.16; 711/162

(58) Field of Classification Search ................ 358/1.16, 358/1.15, 1.14, 1.18, 1.13, 400, 448, 296, 358/402; 709/201, 220, 230; 707/3, 10, 707/200; 711/154, 162, 161, 117; 714/45; 705/1, 7; 399/8, 23, 27

See application file for complete search history.

(56) References Cited

U.S. PATENT DOCUMENTS

2005/0052684 A1* 3/2005 Ferlitsch .................... 358/1.15

FOREIGN PATENT DOCUMENTS

| JP | 07-319773 A | 12/1995 |
| JP | 2003-280867 A | 10/2003 |

* cited by examiner

*Primary Examiner*—Saeid Ebrahimi Dehkordy
(74) *Attorney, Agent, or Firm*—Sughrue Mion, PLLC

(57) ABSTRACT

A device that performs processing upon receiving a request from a terminal, which includes: a processing information storage unit that stores information relating to the processing; a processing history generating unit that generates a history of the processing based on the information relating to the processing stored in the processing information storage unit; a processing history transmitting unit that transmits the history of the processing generated by the processing history generating unit to the terminal; and a restriction setting unit that sets restriction on the history of the processing, in which the processing history generating unit generates the history of the processing according to the restriction set by the restriction setting unit.

6 Claims, 7 Drawing Sheets

JOB HISTORY

| HOST NAME | IP ADRESS | MAC ADRESS | JOB ID | JOB NAME | USER NAME | STATUS | NO.OF SHEETS |
|---|---|---|---|---|---|---|---|
| A | 11.22.33.11 | 123456789012 | 0002 | DOCUMENT 1 | FUJI TARO | COMPLETED | 2 |
| C | 11.22.33.33 | 098765432109 | 0011 | CLASSIFIED DOCUMENT | OGAWA HANAKO | COMPLETED | 11 |
| A | 11.22.33.11 | 123456789012 | 0002 | STRUCTURE CHART | FUJI TARO | COMPLETED | 2 |
| B | 11.22.33.22 | 123456789099 | 0201 | PERSONAL EVALUATION A | KOBAYASHI JIRO | COMPLETED | 3 |
| C | 11.22.33.33 | 098765432109 | 0012 | REORGANISATION | OGAWA HANAKO | COMPLETED | 5 |
| C | 11.22.33.33 | 098765432109 | 0013 | PERSONNEL RELOCATION | OGAWA HANAKO | CANCELED | 21 |
| B | 11.22.33.22 | 123456789099 | 0202 | APPOINTMENT LETTER TO YAMADA | KOBAYASHI JIRO | COMPLETED | 1 |
| A | 11.22.33.11 | 123456789012 | 0003 | MAP | FUJI TARO | PRINTING | 254 |

FIG.3

JOB HISTORY

| HOST NAME | IP ADRESS | MAC ADRESS | JOB ID | JOB NAME | USER NAME | STATUS | NO.OF SHEETS |
|---|---|---|---|---|---|---|---|
| A | 11.22.33.11 | 1234567789012 | 0002 | DOCUMENT 1 | FUJI TARO | COMPLETED | 2 |
| A | 11.22.33.11 | 1234567789012 | 0002 | STRUCTURE CHART | FUJI TARO | COMPLETED | 2 |
| A | 11.22.33.11 | 1234567789012 | 0003 | MAP | FUJI TARO | PRINTING | 245 |

FIG.4A

JOB HISTORY

| HOST NAME | IP ADRESS | MAC ADRESS | JOB ID | JOB NAME | USER NAME | STATUS | NO.OF SHEETS |
|---|---|---|---|---|---|---|---|
| C | 11.22.33.33 | 0987654432109 | 0011 | CLASSIFIED DOCUMENT | OGAWA HANAKO | COMPLETED | 11 |
| C | 11.22.33.33 | 0987654432109 | 0012 | REORGANISATION | OGAWA HANAKO | COMPLETED | 5 |
| C | 11.22.33.33 | 0987654432109 | 0013 | PERSONNEL RELOCATION | OGAWA HANAKO | CANCELED | 21 |

FIG.4B

JOB HISTORY

| HOST NAME | IP ADRESS | MAC ADRESS | JOB ID | JOB NAME | USER NAME | STATUS | NO.OF SHEETS |
|---|---|---|---|---|---|---|---|
| A | 11.22.33.11 | 1234567789012 | 0002 | DOCUMENT 1 | FUJI TARO | COMPLETED | 2 |
| A | 11.22.33.11 | 1234567789012 | 0002 | STRUCTURE CHART | FUJI TARO | COMPLETED | 2 |

FIG.4C

DEVICE AND METHOD FOR RESTRICTING DISPLAY OF HISTORY

BACKGROUND OF THE INVENTION

1. Field of the Invention

The present invention relates to a device and a method for restricting a display of a history, and particularly to a device and a method for restricting the display of a job history for disclosing the job history stored by the device to a terminal.

2. Description of the Related Art

Conventionally, a device such as a printing device has a function to display a history of jobs processed by the device (hereafter referred to as "job history").

For example, there have been proposed a printing system, a printing device, and a program, according to which a printing device is provided with a Web server so that the progress of print processing that is being performed by the printing device can be easily known through the Web server, and further the progress can be recognized not only in terms of a number of printed pages but also in terms of the content (see Japanese Patent Application Laid-Open No. 2003-280867, for example).

There have also been proposed an image processing device and method, according to which confidentiality of data such as PIN numbers and forgery preventing data stored within an image processing device is protected by restricting access from an external equipment to the data in the image processing device based on a type of data for which access is requested (see Japanese Patent Application Laid-Open No. 7-319773, for example).

However, it is not only a system manager who wants to check the history of jobs processed by a device. Users using the device also want to check the history of jobs done by them. There has conventionally been proposed a technique to allow the device users to check their job history. According to this technique, however, the device users are required to register themselves and to be authenticated in order to check their job history. The user registration involves a lot of efforts, and moreover a storage area has to be ensured for the user registration, resulting in increase of cost.

SUMMARY OF THE INVENTION

The present invention has been made in view of the above circumstances and provides a device and a method for restricting a display of a history, which is able to ensure high security by allowing only a user using the device to have access to the job history while inhibiting any other user from access thereto.

An aspect of the present invention provides a device that performs processing upon receiving a request from a terminal, which includes: a processing information storage unit that stores information relating to the processing; a processing history generating unit that generates a history of the processing based on the information relating to the processing stored in the processing information storage unit; a processing history transmitting unit that transmits the history of the processing generated by the processing history generating unit to the terminal; and a restriction setting unit that sets restriction on the history of the processing, in which the processing history generating unit generates the history of the processing according to the restriction set by the restriction setting unit.

And another aspect of the present invention provides a history displaying restriction method that is executed by a device performing processing upon receiving a request from a terminal, which includes: storing, by a processing information storage unit, information relating to the processing; setting, by a restriction setting unit, restriction on a history of the processing; generating, by a processing history generating unit, the history of the processing in accordance with the restriction and based on the stored information relating to the processing; and transmitting, by a processing history transmitting unit, the history of the processing to the terminal.

BRIEF DESCRIPTION OF THE DRAWINGS

Embodiments of the present invention will be described in detail based on the following figures, in which:

FIG. 3 is a diagram illustrating an example of a job history page;

FIGS. 4A to 4C are diagrams illustrating examples of job history pages for which display restriction is set;

DETAILED DESCRIPTION OF THE INVENTION

Embodiments of a device and a method for restricting the display of a history according to the present invention will be described with reference to the accompanying drawings. The device according to the present invention may be a device or apparatus such as a printer, a scanner, a router, or a facsimile as long as it stores and manages job history. The following description of an embodiment will be made in terms of a printer as an example.

Figure 1:
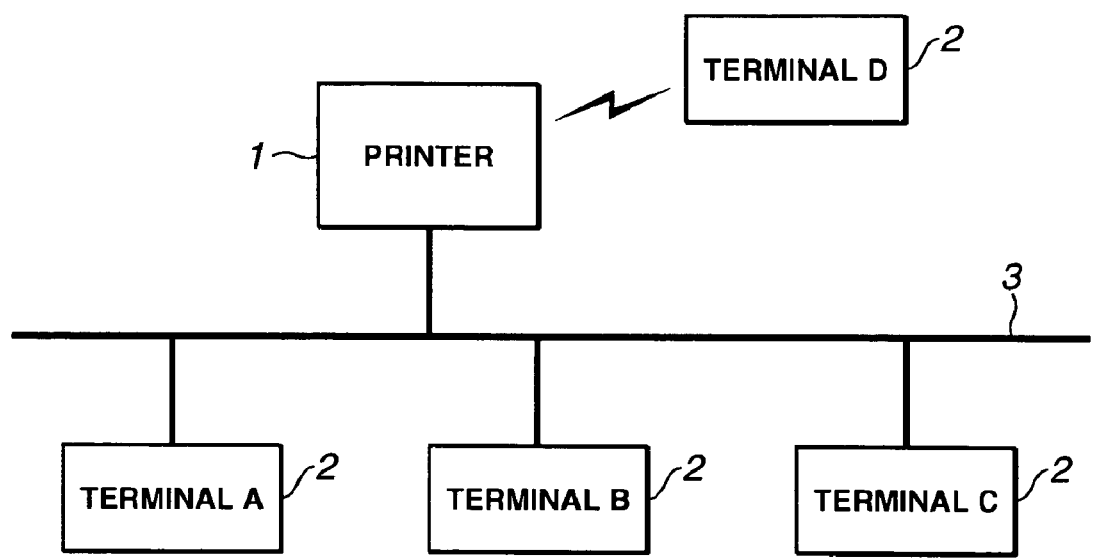
FIG. 1 is a system block diagram illustrating an example of a system to which a device according to the present invention is applied.

FIG. 1 is a system block diagram illustrating an example of a system to which a device according to the present invention is applied.

As shown in FIG. 1, a printer 1 as the device according to the present invention is connected, through a network 3, to terminals (A, B, C, D) 2 such as desktop personal computers (PCs), notebook PCs, personal digital assistances (PDA), and cellular phones.

When one of the terminals 2 transmits a print job to the printer 1 through the network 3 or a wireless circuit such as Bluetooth or IEEE802.11g, the printer 1 receives the print job, performs print processing for the print job, and stores and manages job history of the print job.

Figure 2:
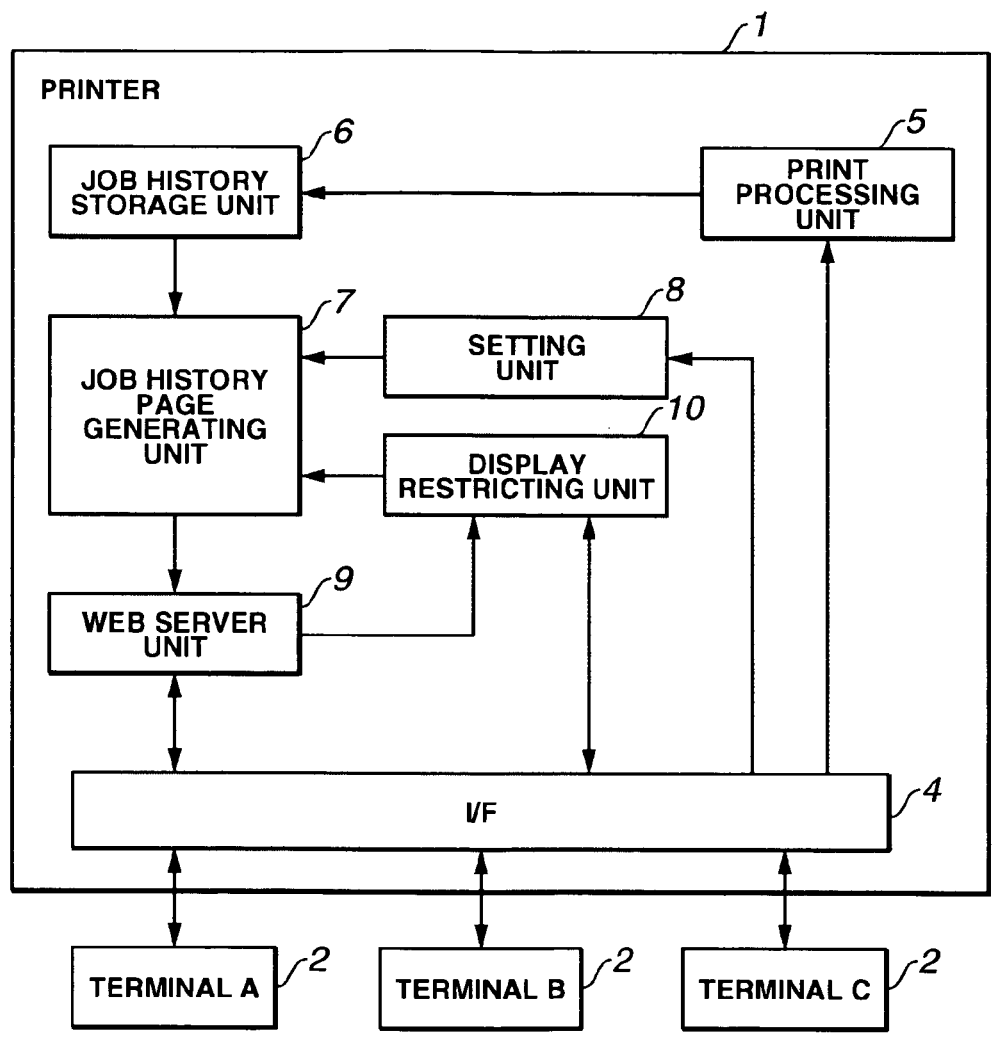
FIG. 2 is a block diagram illustrating an example of functional configuration of the printer shown in FIG. 1.

FIG. 2 is a block diagram illustrating an example of functional configuration of the printer 1 shown in FIG. 1.

As shown in FIG. 2, the printer 1 includes an interface (I/F) 4, a print processing unit 5, a job history storage unit 6, a job history page generating unit 7, a setting unit 8, a Web server unit 9, and a display restricting unit 10.

The I/F 4 is a data communication interface that can be connected to the network 3 such as Internet and intranet.

The print processing unit 5 performs print processing for a print job received from the terminal 2.

The job history storage unit 6 stores and manages job histories of print jobs performed by the print processing unit 5.

The job history page generating unit 7 generates a job history list containing job histories stored in the job history storage unit 6 on a web page using HTML (Hyper Text Markup Language) (hereafter referred to as "job history page"). If display restriction is set by the setting unit 8, the job history page generating unit 7 generates a job history page according to the set condition.

The setting unit 8 performs processing to set restriction on the display of job history pages generated by the job history page generating unit 7. The display restriction can also be set from the terminal 2 via the network 3. Particulars of the display restriction will be described later.

The Web server unit 9 transmits the job history page generated by the job history page generating unit 7 to the terminal 2 accessing the printer 1.

The display restricting unit 10 performs processing to identify terminal identifying information of the terminal 2 requesting a job history page to the printer 1, such as a host name, protocol, IP address, DNS (Domain Name System) name, MAC (Media Access Control) address, cellular phone number, facsimile number, AppleTalk node ID, network ID, IPX address, NetBIOS name, or Bluetooth self-identification name. The display restricting unit 10 also performs processing to request to and receive from the terminal 2 requesting a job history page to the printer 1, PJL (Printer Job Language) information such as a job ID, job name, and user name (hereafter, referred to as "PJL information"). The PJL refers to a printing command language for providing a function to control the print job that is being performed by the printer 1. When generating a print job transmitted from the terminal 2 to the printer 1, the user is able to input the information such as job ID as described above into the print job.

A description will now be made on the restriction on the display of job history pages.

FIG. 3 is a diagram showing an example of a job history page.

The job history page shown in FIG. 3 displays the entire history of the print jobs processed by the printer, and the displayed job history includes, for each job, a host name, IP address, MAC address, job ID, job name, user name, job status, and a number of sheets printed.

The host name, IP address, and MAC address are the terminal identifying information described above, while the job ID, job name, and user name are the PJL information described above.

If the display restriction is not set by the setting unit 8, the job history page generating unit 7 will generate a job history page displaying the entire history of the print jobs processed by the printer as shown in FIG. 3, and transmit the job history page to all the terminals requesting the job history page.

FIG. 4A is a diagram showing an example of a job history page that is displayed when the display of the job history page shown in FIG. 3 is restricted based on the terminal identifying information.

When the display restriction is set based on the terminal identifying information, the display restricting unit discriminates the terminal identifying information of the terminal requesting the job history page to the printer, and the job history page generating unit generates a job history page displaying only the job history that contains the terminal identifying information discriminated by the display restricting unit.

The job history page shown in FIG. 4A is generated under the display restriction based on the terminal identifying information of the terminal A. As shown in FIG. 4A, the job history page displays only the history of jobs received from the terminal A. This means that the owner of the terminal A is freed from the trouble of looking through the job history page displaying the entire job history for the history of the jobs from the terminal A. On the other hand, high security can be ensured because the owner of the terminal A is not allowed to have access to the history of jobs from other terminals.

It is also possible to set an item of the terminal identifying information when the setting unit sets the display restriction. For example, the item of "host name" may be set. In this case, the host name of the terminal requesting a job history page to the printer is discriminated and a job history page displaying the job history containing the set host name is generated.

FIG. 4B is a diagram showing an example of a job history page that is displayed when the display of the job history page shown in FIG. 3 is restricted based on the PJL information.

When the display restriction based on the PJL information is set, the display restricting unit requires the terminal that requests a job history page to input the PJL information, and the job history page generating unit generates a job history page displaying only the job history that contains the PJL information input from the terminal.

The job history page shown in FIG. 4B is generated under the display restriction based on the user name "OGAWA Hanako" as the PJL information. As shown in FIG. 4B, the job history page displays only the history of the jobs having the user name of "OGAWA Hanako". This means that the user, OGAWA Hanako, is freed from the trouble of searching for the history of the jobs performed by her from the job history page displaying the entire job history. On the other hand, high security can be ensured because OGAWA Hanako is not allowed to have access to the history of jobs performed by other users.

The display restriction can be set not only based on either the terminal identifying information or on the PJL information, but also based on the combination of the terminal identifying information and the PJL information.

FIG. 4C is a diagram showing an example of a job history page that is displayed when the display of the job history page shown in FIG. 3 is restricted based on the combination of the terminal identifying information and the PJL information.

When the display restriction is set based on the combination of the terminal identifying information and the PJL information, the display restricting unit discriminates the terminal identifying information of the terminal that requests a job history page from the printer, and requires the terminal to input the PJL information. The job history page generating unit generates a job history page displaying only the job history that contains the discriminated terminal identifying information and the PJL information input from the terminal.

The job history page shown in FIG. 4C is generated under the display restriction based on the terminal identifying information of the terminal A and the job ID of "0002" as the PJL information. As shown in FIG. 4C, the job history page displays only the history of the jobs received from the terminal A and having the job ID of "0002". In some cases, plural users use one terminal to performs jobs. In such cases, the display restriction that is only based on the terminal identifying information will allow all the users using the same terminal to have access to the history of jobs performed by other users. In contrast, when the display restriction is set based on the combination of the terminal identifying information and the PJL information, none of the users can have access to the history of the jobs performed by other users using the same terminal. Therefore, higher security can be ensured.

Figure 5:
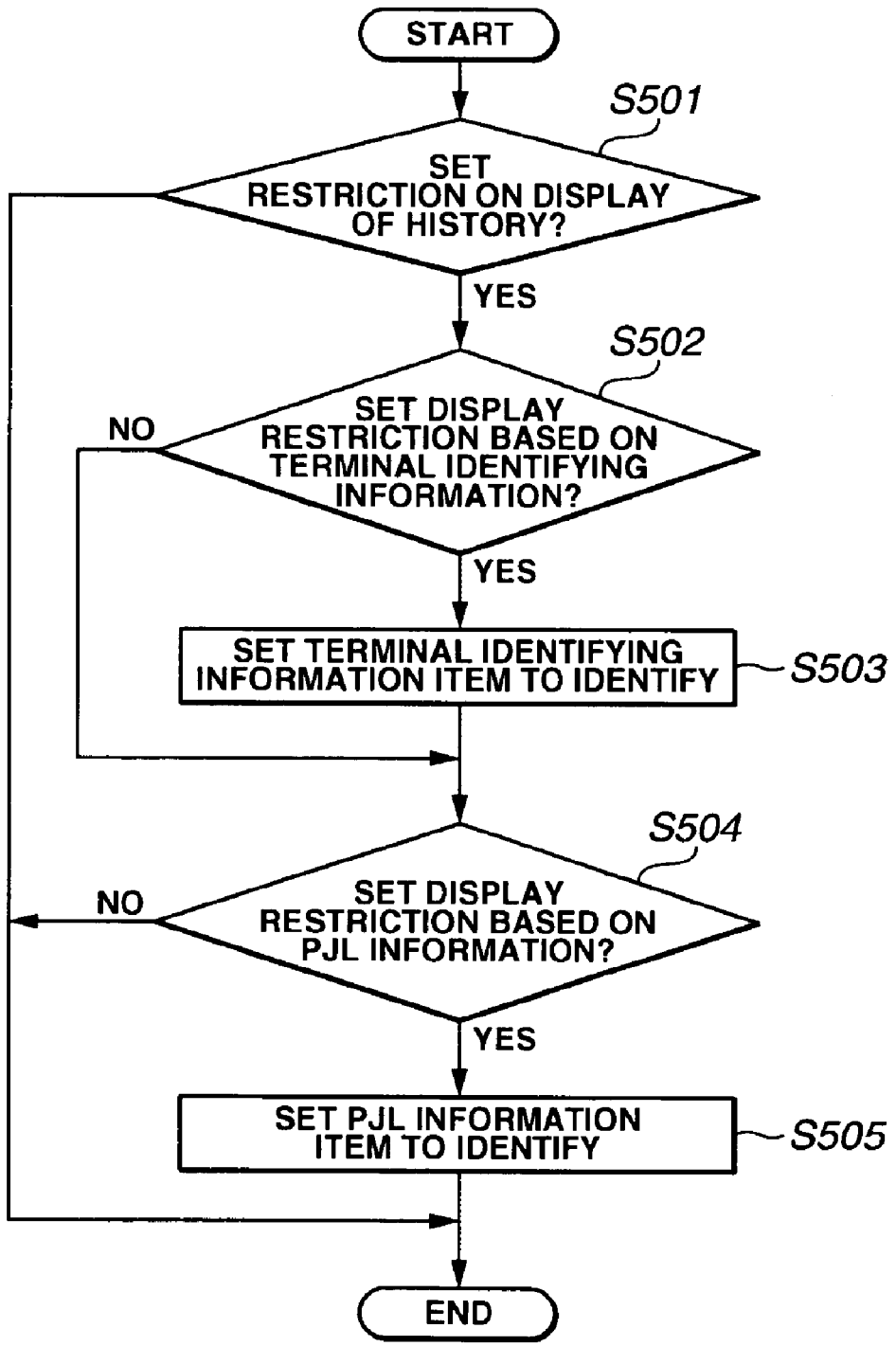
FIG. 5 is a flowchart illustrating processing to set display restriction performed by a setting unit.

A description will now be made on the setting processing of the display restriction performed by the setting unit with reference to the flowchart of FIG. 5.

When the display restriction is set for the display of the job history (YES in step S501), it is then set whether or not the display is restricted based on the terminal identifying information (step S502). If the display restriction based on the terminal identifying information is set (YES in step S502), the processing proceeds to step S503. Whereas, if the display restriction based on the terminal identifying information is not set (NO in step S502), the processing proceeds to step S504.

When the display restriction based on the terminal identifying information is set (YES in step S502), an item of the terminal identifying information to identify (e.g., the host name, protocol, IP address, DNS name, MAC address, cellular phone number, facsimile number, AppleTalk node ID, network ID, IPX address, NetBIOS name, and Bluetooth self-identification name) is set (step S503), and the processing proceeds to step S504.

It is then set whether or not the display is restricted based on the PJL information (step S504). If the display restriction based on the PJL information is set (YES in step S504), the processing proceeds to step S505. Whereas, if display restriction based on the PJL information is not set (No in step S504), the processing is terminated.

When the display restriction based on the PJL information is set (YES in step S504), an item of the PJL information (e.g., the job ID, job name, and user name) is set (step S505), and the processing is terminated.

A description will now be made on the processing to generate a job history page performed by the job a history page generating unit, with reference to the flowchart of FIG. 6.

Upon receiving a request for a job history page from a terminal (step S601), it is checked whether the display is restricted based on the terminal identifying information (step S602). If the display is restricted based on the terminal identifying information (YES in step S602), the processing proceeds to step S603. Whereas, if the display is not restricted based on the terminal identifying information (NO in step S602), the processing proceeds to the step indicated by "A" in the flowchart of FIG. 7.

When the display restriction is set based on the terminal identifying information (YES in step S602), the terminal identifying information of the terminal is discriminated (step S603), and it is checked whether or not there is a job history containing the terminal identifying information of the terminal (step S604). If there is no job history containing the terminal identifying information of the terminal (No in step S604), the processing proceeds to step S605, whereas, if there is a job history containing the terminal identifying information of the terminal (YES in step S604), the processing proceeds to step S606.

When there is no job history containing the terminal identifying information of the terminal (NO in step S604), a job history page containing no job history is generated (step S605), and the processing proceeds to step S611.

When there is a job history containing the terminal identifying information of the terminal (YES in step S604), it is checked whether or not the display restriction is set based on the PJL information (step S606). If the display restriction is not set based on the PJL information (NO in step S606), the processing proceeds to step S607. Whereas, if the display restriction is set based on the PJL information (YES in step S606), the processing proceeds to step S608.

When the display restriction is not set based on the PJL information (NO in step S606), a job history page is generated with the display restricted based on the terminal identifying information is generated (step S607), and the processing proceeds to step S611.

When the display restriction is set based on the PJL information (YES in step S606), the PJL information is received from the terminal (step S608), and it is checked whether or not there is a job history containing the received PJL information (step S609). If there is no job history containing the received PJL information (NO in step S609), the processing proceeds to step S605. If there is a job history containing the received PJL information (YES in step S609), the processing proceeds to step S610.

When there is no job history containing the PJL information (NO in step S609), a job history page containing no job history is generated (step S605), and the processing proceeds to step S611.

When there is a job history containing the PJL information (YES in step S609), a job history page is generated with the display being restricted based on the terminal identifying information and the PJL information (step S610), and the processing proceeds to step S611.

The generated job history page is transmitted to the terminal (step S611), and the processing is terminated.

A description will now be made, with reference to the flowchart of FIG. 7, on the processing to generate a job history page when the display restriction is not set based on the terminal identifying information in step S602 in the flowchart of FIG. 6.

Figure 6:
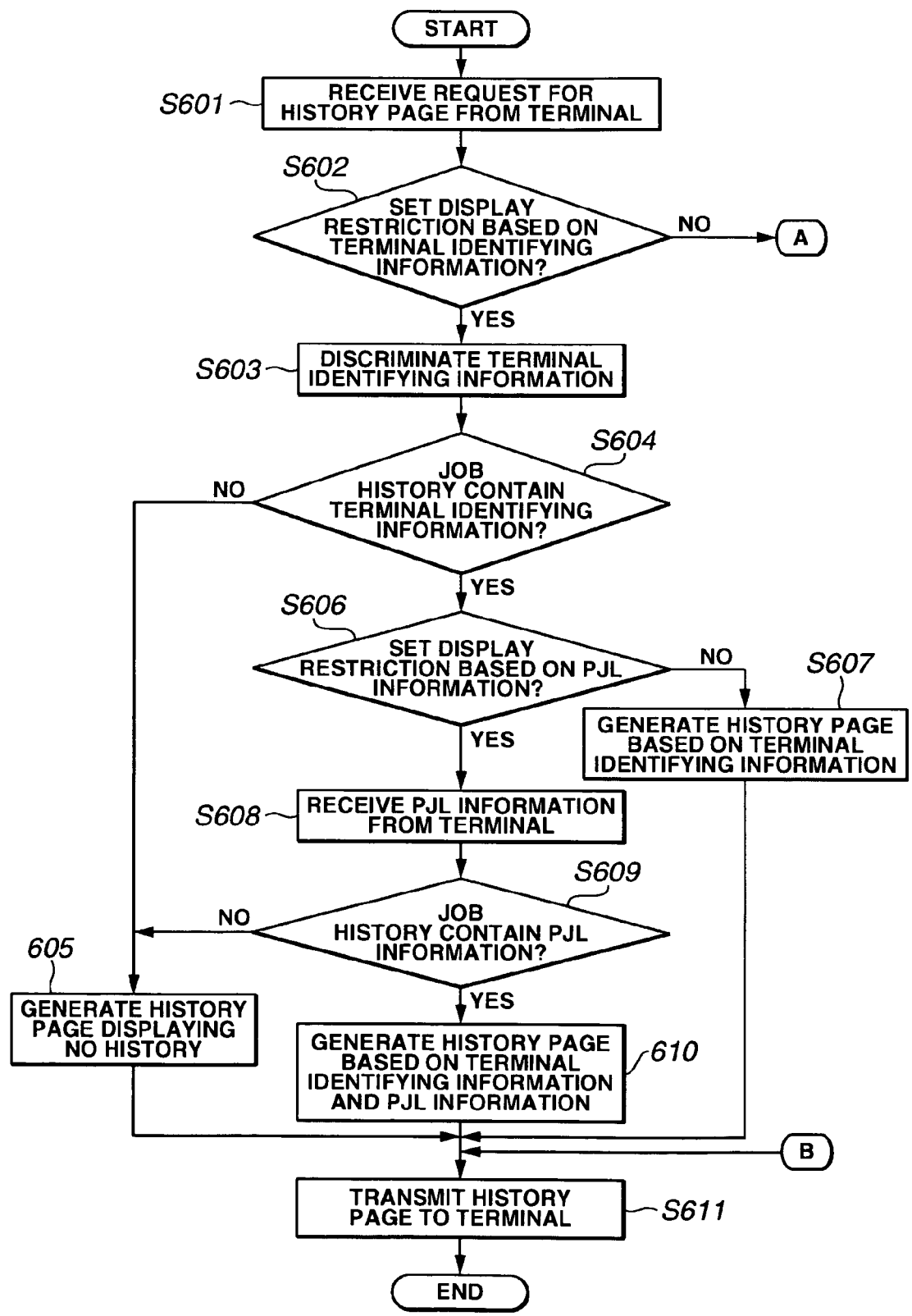
FIG. 6 is a flowchart illustrating processing to generate a job history page performed by a job history page generating unit.
Figure 7:
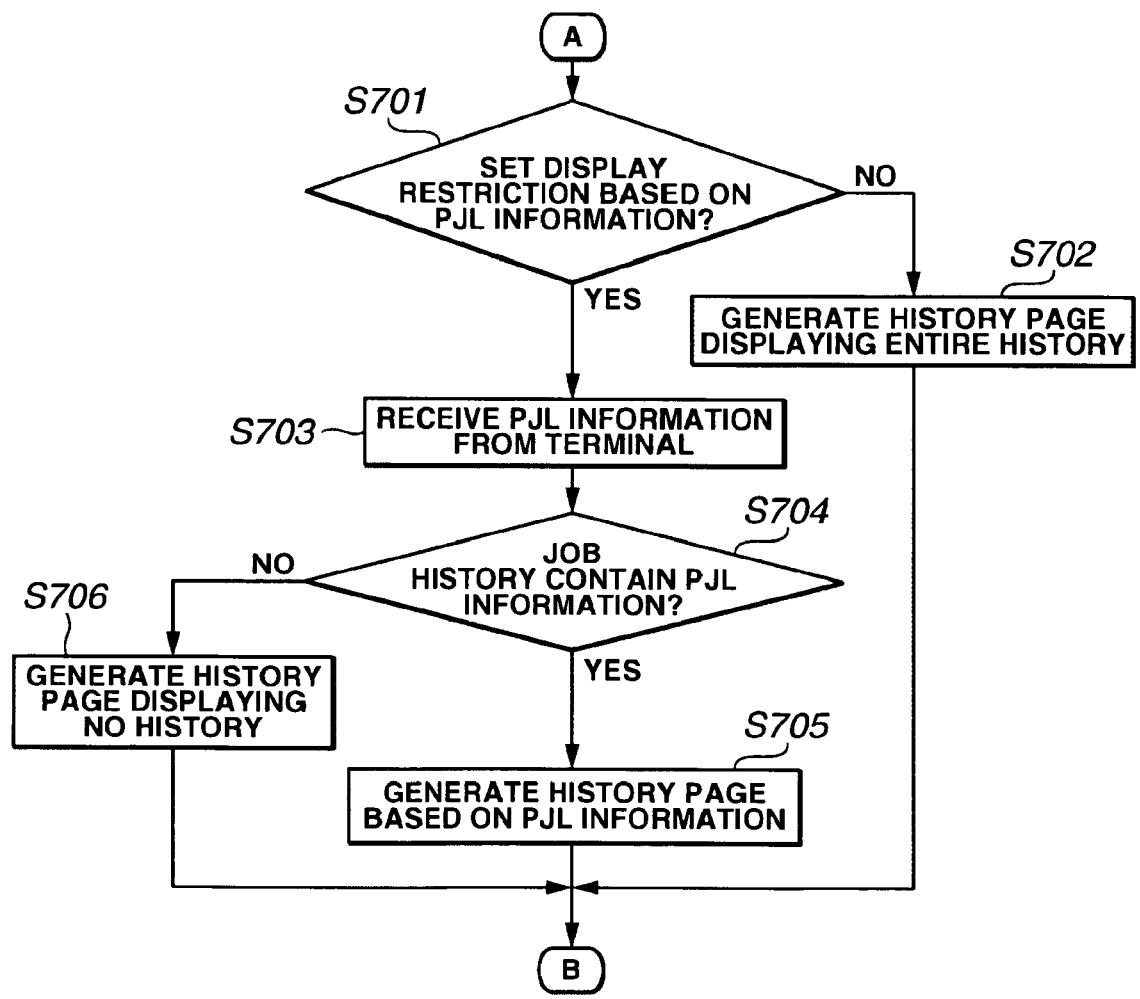
FIG. 7 is a flowchart illustrating processing to generate a job history page performed when display restriction is not set based on terminal identifying information in step S602 in the flowchart of FIG. 6.

When the display restriction is not set based on the terminal identifying information in step S602 in the flowchart of FIG. 6, it is checked whether or not the display restriction is set based on the PJL information (step S701). If the display restriction is not set based on the PJL information either (NO in step S701), the processing proceeds to step S702. Whereas, if the display restriction is set based on the PJL information (YES in step S701), the processing proceeds to step S703.

When the display restriction is not set based on the PJL information (NO in step S701), a job history page displaying the entire job history is generated (step S702), and the processing proceeds to step S611 in the flowchart of FIG. 6.

When the display restriction is set based on the PJL information (YES in step S701), the PJL information is received from the terminal (step S703), and it is checked whether or not there is a job history containing the received PJL information (step S704). If there is a job history containing the received PJL information (YES in step S704), the processing proceeds to step S705. Whereas, if there is no job history containing the PJL information (NO in step S704), the processing proceeds to step S706.

When there is a job history containing the PJL information (YES in step S704), a job history page is generated with the display restricted based on the PJL information (step S705), and the processing proceeds to step S611 in the flowchart of FIG. 6.

When there is no job history containing the PJL information (NO in step S704), a job history page containing no job history is generated (step S706), and the processing proceeds to step S611 in the flowchart of FIG. 6.

As described above, a first aspect of the invention provides a device that performs processing upon receiving a request from a terminal, which includes: a processing information storage unit that stores information relating to the processing; a processing history generating unit that generates a history of the processing based on the information relating to the processing stored in the processing information storage unit; a processing history transmitting unit that transmits the history of the processing generated by the processing history generating unit to the terminal; and a restriction setting unit that sets restriction on the history of the processing, in which the processing history generating unit generates the history of the processing according to the restriction set by the restriction setting unit.

A second aspect of the present invention provides the device, according to the first aspect of the invention, in which the information may include terminal identifying information of the terminal requesting the processing, and attribute information relating to the request of the processing.

A third aspect of the present invention provides the device, according to the second aspect of the invention, in which the restriction setting unit may set the restriction based on the terminal identifying information.

A fourth aspect of the present invention provides the device, according to the third aspect of the invention, which may further include a discrimination unit for discriminating the terminal identifying information of the terminal requesting the history of the processing, in which the processing history generating unit may generate the history of the processing based on the information relating to the processing and including the terminal identifying information discriminated by the discrimination unit.

A fifth aspect of the present invention provides the device, according to the second aspect of the invention, in which the restriction setting unit may set restriction based on the attribute information.

A sixth aspect of the present invention provides the device, according to the fifth aspect of the invention, which may further include an obtaining unit that obtains the attribute information from the terminal requesting the history of the processing, in which the processing history generating unit may generate the history of the processing based on the information relating to the processing and including the attribute information obtained by the obtaining unit.

A seventh aspect of the present invention provides the device, according to the second aspect of the invention, in which the restriction setting unit may set the restriction based on the terminal identifying information and the attribute information.

An eighth aspect of the present invention provides the device, according to the seventh aspect of the invention, which may further include: a discrimination unit that discriminates the terminal identifying information of the terminal requesting the history of the processing; and an obtaining unit that obtains the attribute information of the terminal requesting the history of the processing, in which the processing history generating unit may generate the history of the processing based on the information relating to the processing and including the terminal identifying information discriminated by the discrimination unit and the attribute information obtained by the obtaining unit.

A ninth aspect of the present invention provides a history displaying restriction method that is executed by a device performing processing upon receiving a request from a terminal, which includes: storing, by a processing information storage unit, information relating to the processing; setting, by a restriction setting unit, restriction on a history of the processing; generating, by a processing history generating unit, the history of the processing in accordance with the restriction and based on the stored information relating to the processing; and transmitting, by a processing history transmitting unit, the history of the processing to the terminal.

A tenth aspect of the present invention provides the method according to the ninth aspect of the invention, in which the information may include terminal identifying information of the terminal requesting the processing, and attribute information relating to the request of the processing.

An eleventh aspect of the present invention provides the method according to the tenth aspect of the invention, which may include: setting, by the restriction setting unit, the restriction based on the terminal identifying information.

A twelfth aspect of the present invention provides the method according to the eleventh aspect of the invention, which may include: discriminating, by a discrimination unit, the terminal identifying information of the terminal requesting the history of the processing; and generating, by the processing history generating unit, the history of the processing based on the information relating to the processing and including the discriminated terminal identifying information.

A thirteenth aspect of the present invention provides the method according to the tenth aspect of the invention, which may include setting, by the restriction setting unit, restriction based on the attribute information.

A fourteenth aspect of the present invention provides the method according to the thirteenth aspect of the invention, which may include: obtaining, by an obtaining unit, the attribute information from the terminal requesting the history of the processing; and generating, by the processing history generating unit, the history of the processing based on the information relating to the processing and including the obtained attribute information.

A fifteenth aspect of the present invention provides the method according to the tenth aspect of the invention, which may include setting, by the restriction setting unit, the restriction based on the terminal identifying information and the attribute information.

A sixteenth aspect of the present invention provides the method according to the fifteenth aspect of the invention, which may include: discriminating, by the discrimination unit, the terminal identifying information of the terminal requesting the history of the processing; obtaining, by an obtaining unit, the attribute information from the terminal requesting the history of the processing; and generating, by the processing history generating unit, the history of the processing based on the information relating to the processing and including the discriminated terminal identifying information and the obtained attribute information.

According to an aspect of the present invention, only the user using the device is allowed to have access to the job history, while other users are prohibited from having access thereto, whereby an advantage of a high security being ensured can be obtained.

The foregoing description of the embodiment of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-266965 filed on Sep. 14, 2005 including specification, claims, drawings and abstract is incorporated herein by reference in its entirety.

What is claimed is:

1. A device that performs processing upon receiving a request from a terminal, comprising:
- an obtaining unit that obtains attribute information relating to the request of the processing from the terminal requesting a history of the processing;
- a processing information storage unit that stores information relating to the processing, the information comprising the attribute information relating to the request of the processing;
- a restriction setting unit that sets a restriction on a history of the processing based on the attribute information;
- a processing history generating unit that generates the history of the processing based on the information relating to the processing stored in the processing information storage unit and according to the restriction set by the restriction setting unit; and
- a processing history transmitting unit that transmits the history of the processing generated by the processing history generating unit to the terminal.

2. The device according to claim 1, wherein the attribute information comprises at least one of a job identification of the processing, a job name of the processing, and a name of a user requesting the processing.

3. The device according to claim 1, wherein the information further includes terminal identifying information of the terminal requesting the processing,
- wherein the device further comprises a discrimination unit that discriminates the terminal identifying information of the terminal requesting the history of the processing, and
- wherein the processing history generating unit generates the history of the processing based on the information relating to the processing and including the terminal identifying information discriminated by the discrimination unit and the attribute information obtained by the obtained unit.

4. A history displaying restriction method that is executed by a device performing processing upon receiving a request from a terminal, comprising:
- obtaining, by an obtaining unit, attribute information relating to the request of the processing from the terminal requesting a history of the processing;
- storing, by a processing information storage unit, information relating to the processing, the information comprising the attribute information relating to the request of the processing;
- setting, by a restriction setting unit, a restriction on a history of the processing based on the attribute information;
- generating, by a history generating unit, the history of the processing based on the information relating to the processing stored in the processing information storage unit and according to the restriction set by the restriction setting unit; and
- transmitting, by a processing history transmitting unit, the history of the processing generated by the processing history generating unit to the terminal.

5. The method according to claim 4, wherein the attribute information comprises at least one of a job identification of the processing, a job name of the processing, and a name of a user requesting the processing.

6. The method according to claim 4, wherein the information further includes terminal identifying information of the terminal requesting the processing,
- wherein the method further comprises discriminating, by a discriminating unit, the terminal identifying information of the terminal requesting the history of the processing, and
- wherein the method further comprises generating, by the processing history generating unit, the history of the processing based on the information relating to the processing and including the discriminated terminal identifying information and the obtained attribute information.

* * * * *